Oct. 16, 1962     F. G. GREAVES     3,058,625
MATERIAL HANDLING SLIDE VALVE
Filed Nov. 12, 1958     2 Sheets-Sheet 1
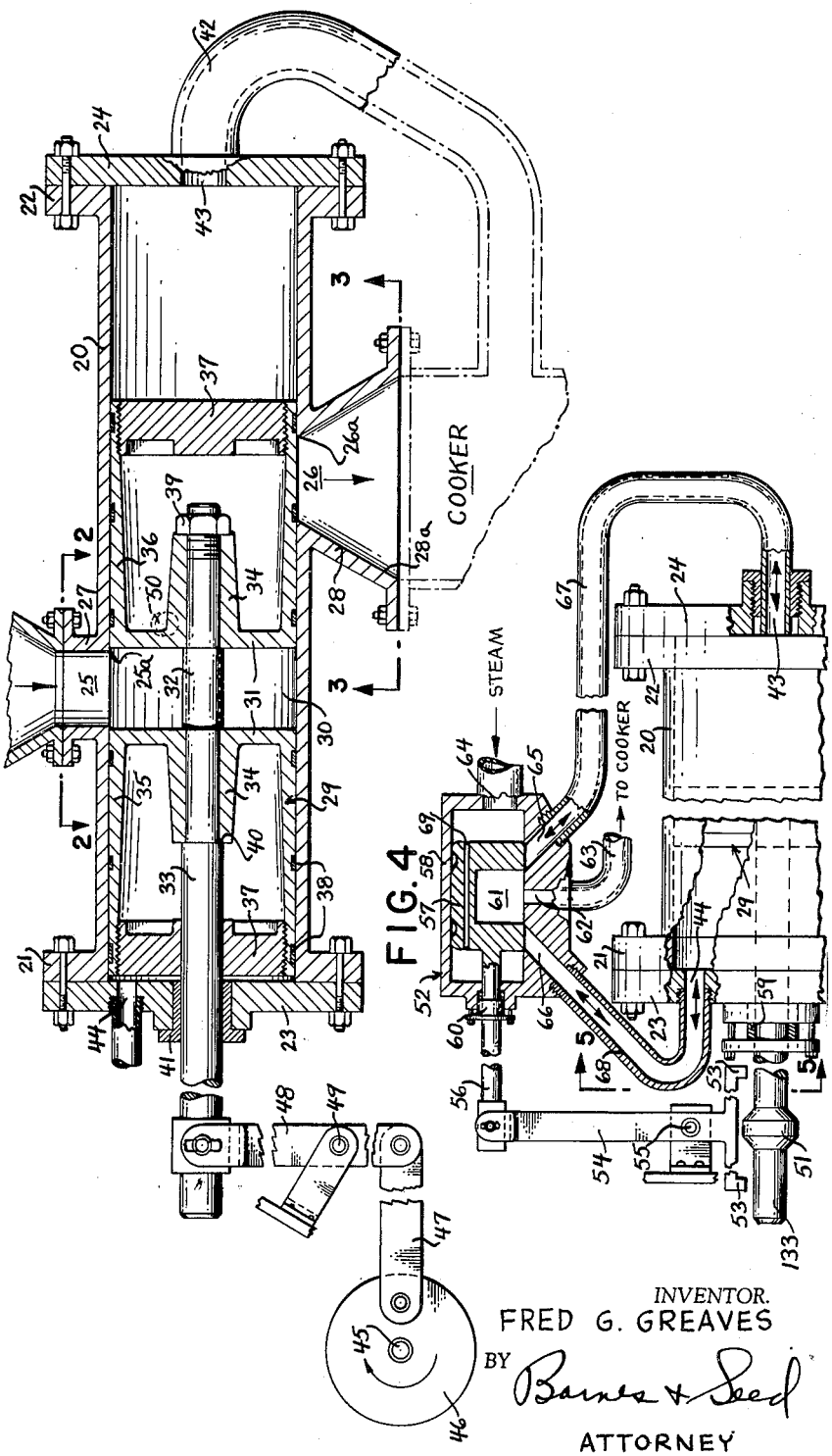
INVENTOR.
FRED G. GREAVES
BY Barnes & Seed
ATTORNEY

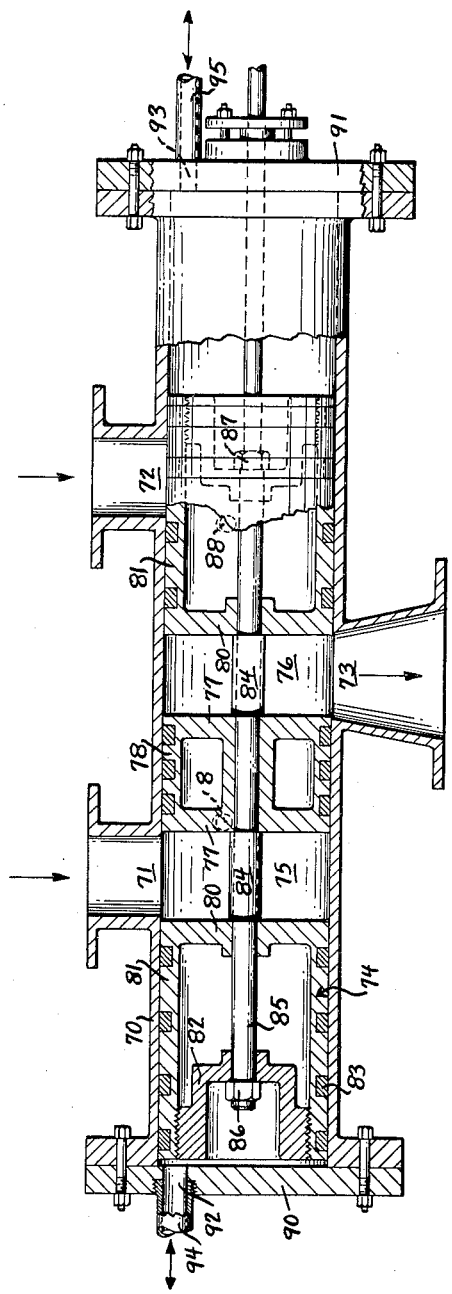
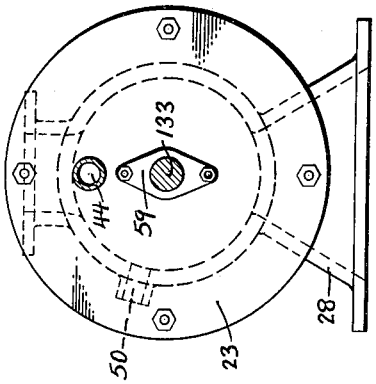
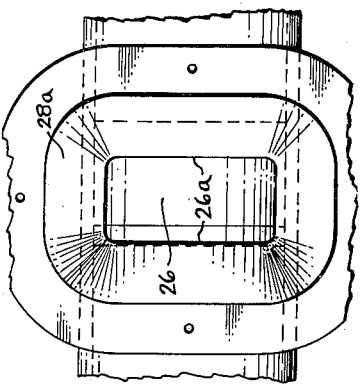
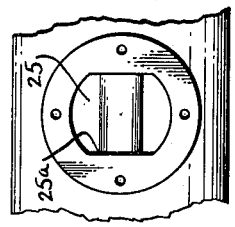
INVENTOR.
FRED G. GREAVES
BY Barnes & Seed
ATTORNEY

United States Patent Office 3,058,625
Patented Oct. 16, 1962

3,058,625
MATERIAL HANDLING SLIDE VALVE
Fred G. Greaves, 418 8th Ave. N., Seattle, Wash.
Filed Nov. 12, 1958, Ser. No. 773,366
4 Claims. (Cl. 222—137)

The present invention relates to material handling valves used to continuously feed materials between regions of different pressures. More particularly, the invention relates to such a valve in which a pocketed slide valve reciprocates between inlet and outlet ports.

The present invention has important application in relation to the cooking of wood chips at high pressures and aims to provide an improved valve of simple and economical construction and operation which will continuously feed such chips into a pressurized cooker and, in duplicate, to continuously discharge cooked wood fibers from the cooker without an objectionable loss of pressure and without likelihood of binding from fibers and wood degradation products.

As a further object the invention aims to provide such a valve which can be efficiently driven by steam thereafter utilized in the cooker.

The foregoing and other still more particular objects and advantages in view will appear and be understood in the course of the following description and claims, the invention consisting in the novel construction and in the adaptation and combination of parts hereinafter described and claimed.

In the accompanying drawings:

FIGURE 1 is a longitudinal sectional view of a first embodiment of my invention.

FIGS. 2 and 3 are horizontal sectional views taken as indicated by the lines 2—2 and 3—3, respectively, of FIG. 1.

FIG. 4 is a semi-diagrammatic elevational view, partly in vertical section and with my material handling valve shown fragmentarily, of a modified drive arrangement for the valve.

FIG. 5 is a sectional view taken as indicated by the line 5—5 of FIG. 4; and

FIG. 6 is an elevational view mostly in longitudinal vertical section of a second embodiment of my material handling valve.

Referring to the embodiment of FIG. 1 it is seen that this feed valve has a cylindrical housing or body 20 provided with end flanges 21—22 to which end plates 23—24 are bolted, respectively. At diametrically opposite sides of the body 20, and spaced apart longitudinally thereof are ingress and egress openings 25—26. These openings have their side edges 25a—26a which are lateral of the body in parallel spaced relation and defining the widths of the inlet and outlet, the latter being preferably slightly wider than the inlet. A flanged lead-in neck 27 is provided at the inlet for connection to a hopper. Similarly, a neck 28 which is flared by sloped sides 28a leads from the egress opening and is flanged for connection to a continuous type cooker indicated fragmentarily by broken lines in FIG. 1.

To work in the body 20 there is provided a two part piston 29 divided at a transverse through-pocket 30. This pocket is defined by opposed piston faces 31 and its width is established by a spacing collar 32 which is sleeved on a piston rod 33 extending through center bosses 34. Surrounding these bosses are respective elongated barrels 35—36 which may be closed by heads 37 and have external circumferential grooves to receive sealing rings 38. To hold the faces 31 against the spacer 32 the rod 33 is threaded at its inner end to receive a nut 39.

In this regard it will be noted that the rod is stepped at a shoulder 40 to complement the nut 28 by seating against a respective one of the piston bosses 34. From this shoulder the shaft extends through a bearing 41 provided in the end plate 23 at the inlet end of the valve.

Desirably, the pocket 30 is given a width greater and less, respectively, than the widths of the ingress and egress openings. Also, of significant import is the fact that the center-to-center spacing of these openings is necessarily less than the length of the barrel 35 and preferably less than the lengths of both barrels.

To minimize cooker pressure losses I prefer to have the outlet end of the valve body closed. To make this possible in the practical sense I place this outlet end in constant communication with the cooker by a pipe 42 which is connected to the end plate 24 at a port 43 therein. This prevents undue added compression of the gas at the outlet end while the valve is moving in that direction. Compression at the inlet end is prevented by a port 44 in the end plate 23.

The rod 33 may be driven externally of the valve as by a motor whose drive shaft 45 is interconnected with the rod by a crank 46, link 47 and connecting rod 48 which is pivoted intermediate its ends at 49. A stroke is selected corresponding to the center-to-center spacing of the ingress and egress valve openings so that the pocket will be shuttled therebetween for filling beneath the ingress opening and discharge over the egress opening. A radial vent 50 is provided in the valve body 20 to vent the pocket after discharge and before reaching the inlet so that there will not be a blow-back at the inlet from a pressurized pocket. This vent should be spaced farther from the egress opening than the width of the pocket so that the vent can never be in direct communication with the cooker via the pocket.

As viewed in FIG. 1 the pocket 30 of the slide valve 29 is in its fill position underlying the ingress opening 25. Further rotation of the motor shaft 45 causes the piston rod 33 to be pushed toward the egress opening 26 through the action of the crank 46, link 47 and connecting rod 48. During the resulting shift of the valve 29 the gas in the outlet end of the body 20 is forced back into the cooker through the pipe 42. When the pocket 30 reaches the egress opening 26 it dumps by gravity through the neck 28 into the cooker. Then as the valve 29 is returned to the fill position the pocket 30 is vented as it passes the vent 50 so that there will not be any blow-back at the inlet 25 due to the charge of gas in the pocket obtained from the cooker during the emptying of the pocket.

If the valve is to be used for discharge purposes with a cooker, the valve body 20 is turned 180 degrees and the inlet and outlet bosses 27—28 are switched during fabrication. In this case the vent 50 has no function and hence is plugged.

In FIG. 4 I have shown a modified drive arrangement in which the feed valve of FIG. 1 is steam driven instead of motor driven. For this modification the end plate 23 is provided with a packing gland 59 in place of the bearing 41 to receive a piston rod 133 of reduced diameter. The tail of this rod has a cam 51 for operating a D-valve 52 by alternate engagement with the two fingers 53 of a forked rocker 54. The latter is rocked at a pivot 55 and is pivotally connected to the rod 56 of the D-valve's shuttle 57. This rod enters the chest 58 of the D-valve through a gland 60. This shuttle has its cavity 61 in constant communication with an exhaust port 62 at the bottom of the chest which is connected by a pipe 63 with the cooker. Steam at a greater pressure than the cooker pressure is supplied to one end of the chest through a port 64 and circulates to the other end thereof through a cross-passage 61 in the shuttle 57. A pair of diverging passages 65—66 at opposite sides of the exhaust port 62 are placed in communication with the ports 43—44 at the opposite ends of the feed valve by pipes 67—68, respectively.

With this drive arrangement it can be seen that the shuttle 57 causes alternate supplying and dumping of steam to and from the ends of the body 20. To elaborate, assuming the valve 29 to be moving to the left from its pocket-dumping position, as it reaches its pocket-filling position the cam 51 engages and lifts the left rocker finger 53. As a result the upper end of the rocker 54 is swung to the right about the pivot 55, thereby causing the rod 56 to shift the shuttle 57 to a position exposing the port 65 to the discharge port 62 via the cavity 61 and revealing the port 66 to the steam supply via the interior of the chest 58. Thus, steam will flow to the left end of the body 20 through the pipe 68 and force the valve 29 to reverse as the pocket 30 is being filled from the overlying hopper. At the same time the right end of the body 20 is placed in communication with the cooker so that the steam to the right of the piston 29 can dump into the cooker and give a differential pressure across the material handling valve. Similarly when the pocket 30 reaches its dump position above the cooker the cam 51 lifts the right finger 53 to move the shuttle 57 to the left for supplying fresh steam to the right end of the piston 29 and dumping the steam at the left end into the cooker. In this manner part of the steam supply for the cooker performs the added function of providing the energy for reciprocating the valve.

At this point it will appear obvious that if desired the valve 29 can be motor driven as in FIG. 1, but in a balanced condition as regards pressure from the cooker. This is readily accomplished by providing the end plate 23 with a gland 59 as in FIG. 4 for the piston rod 33, and connecting the port 44 with the cooker in the same manner as the port 43 is connected by the pipe 42.

Continuing to FIG. 6 it is seen that I have provided a modified material handling valve whose cylindrical body 70 has a pair of top inlets 71—72 at opposite sides of a lower outlet 73, these inlets and outlet being the same shape as those of the body 20. The valve proper 74 has a pair of pockets 75—76 similar to the pocket 30 in that they are desirably slightly wider than the inlets and narrower than the outlet. These pockets are defined by piston faces 77 at the ends of a center barrel 78 and faces 80 at the inner ends of an outer pair of barrels 81. The latter are closed at their outer ends by centrally depressed heads 82 and sealing rings 83 are provided for respective circumferential grooves formed in the barrels therefor.

The faces 77, 80 are held apart by spacers 84 which are sleeved on a piston rod 85 passing centrally through the various sections of the piston. In this regard, a pair of nuts 86—87 are threaded onto the rod and engage the heads 82 to hold the piston sections against the spacers 84. As before, vents 88—89 are provided in the body 70 adjacent the inlets 71—72 and the ends of the body are flanged to receive end plates 90—91 which have ports 92—93. In addition, the plate 91 has a central packing gland for the passage of the tail of the piston rod 85, such being necked at the nut 87.

As pictured in FIG. 6 the modified valve is equipped to be steam driven by the arrangement of FIG. 4, it being only necessary to connect the ports 92—93 by lines 94—95 to the D-valve 52 in the same manner as the lines 67—68 and to provide the tail of the rod 85 with a cam 51 coacting with the afore-described rocker for controlling the shuttle of the D-valve. Alternately, the modified valve can of course be motor driven as in FIG. 1 with the ports 92—93 venting to the atmosphere or connecting by pipes to the related cooker. In this latter regard, the embodiment of FIG. 1 can be motor or otherwise externally driven with less power requirement by using the packing gland 59 rather than the bearing 41 in the end plate 23 and placing the port 44 in constant communication with the cooker along with the port 43 to thereby balance the slide valve. This arrangement also helps to prevent fine particles of the material being handled from working past the slide valve and into the ends of the valve housing.

In operation it is seen that the pockets 75—76 of the FIG. 6 embodiment are shuttled, respectively, between inlet 71 and the outlet 73 and between the inlet 72 and such outlet. For example, FIG. 6 illustrates pocket 75 in the fill position beneath inlet 71 and pocket 76 in the discharge position above the outlet 73. When the valve then shifts to the right, the filled pocket 75 moves to the outlet 73 and the now empty pocket 76 travels to the inlet 72. During this travel the pocket 76 is vented by the vent 88. Similarly, during the subsequent return of the pocket 75 to the inlet 71 it is vented at 89.

The invention and the manner in which the same functions to the accomplishment of the intended end should, it is believed, be clear from the foregoing detailed description of the illustrated embodiments. Changes in the details of construction can be resorted to without departing from the spirit of the invention, wherefor it is intended that no limitations be implied and that the hereto annexed claims be given the broadest interpretation to which the employed language admits.

What I claim is:

1. In a feeder valve, an elongated valve housing having a pair of ingress openings spaced apart at one side thereof and an egress opening midway between said ingress openings and at the opposite side of said housing therefrom, a slide valve arranged to reciprocate in said housing with a stroke corresponding to one-half of the center-to-center distance between said ingress openings and having a pair of transverse pockets therethrough each of which has a width narrower endwise of the valve than the longitudinal distance between said egress opening and said ingress openings so that each said pocket communicates successively with said egress opening and a respective one of said ingress openings at opposite ends of said stroke, said slide valve being extended in both endwise directions beyond said pockets a length sufficient to cover the respective ingress opening while it is not in communication with its respective said pocket and said valve housing having a pair of vent ports between said egress opening and said ingress openings, each of said vent ports being spaced longitudinally of the housing from said egress opening a distance exceeding the width of said pockets, sealing means on said slide valve between its said pockets and also endwise thereof for engaging said valve housing to seal said egress opening, and means for reciprocating said slide valve with said stroke.

2. In a feeder valve, an elongated valve housing having a pair of ingress openings spaced apart at one side thereof and an egress opening midway between said ingress openings and at the opposite side of said housing therefrom, a slide valve arranged to reciprocate in said housing with a stroke corresponding to one-half the center-to-center distance between said ingress openings, and means for reciprocating said slide valve with said stroke, said slide valve including a rod, a pair of spacers sleeved on said rod and each shorter in length than the longitudinal distance between said egress opening and said ingress openings, said spacers being spaced apart a distance which combined with the length of one of the spacers gives a total equal to the longitudinal center-to-center distance between said egress opening and said ingress openings, a center piston unit sealed between said spacers and two outer piston units seated against the outer ends of said spacers, said center piston unit and outer piston units defining a pair of transverse pockets surrounding said spacers and arranged to communicate successively with said egress opening and a respective one of said ingress openings at opposite ends of said stroke, and means on said rod holding said outer piston units against said spacers and the latter against said center piston unit.

3. The feeder valve of claim 2 in which said center piston unit comprises a pair of piston heads connected by a barrel, and in which said outer piston units each have an inner piston head opposing a respective one of said pair of piston heads at opposite ends of said pockets.

4. The feeder valve of claim 3 in which said outer piston units each have a barrel extending from its said inner piston head and having a length as great as the longitudinal center-to-center distance between said egress opening and said ingress openings.

References Cited in the file of this patent

UNITED STATES PATENTS

| | | |
|---|---|---|
| 559,386 | Jones | May 5, 1896 |
| 780,680 | Peterson et al. | Jan. 24, 1905 |
| 847,000 | Helmhold | Mar. 12, 1907 |
| 1,001,853 | Jacobsen | Aug. 29, 1911 |
| 1,274,212 | Thompson | July 30, 1918 |
| 1,528,022 | Keiser | Mar. 3, 1925 |
| 2,472,102 | Freyer | June 7, 1949 |
| 2,704,171 | Coll | Mar. 15, 1955 |